April 19, 1927.

Re. 16,594

E. S. REILAND ET AL

SASH WEIGHT PULLEY

Original Filed Feb. 12. 1925

Inventor

ERNEST S. REILAND
PETER M. REILAND

By Horace Fische

Attorney

Reissued Apr. 19, 1927. Re. 16,594

UNITED STATES PATENT OFFICE.

ERNEST S. REILAND AND PETER M. REILAND, OF ST. PAUL, MINNESOTA, ASSIGNORS TO BAYPORT FOUNDRY COMPANY, OF BAYPORT, MINNESOTA, A CORPORATION OF MINNESOTA.

SASH-WEIGHT PULLEY.

Original No. 1,580,763, dated April 13, 1926, Serial No. 8,675, filed February 12, 1925. Application for reissue filed May 20, 1926. Serial No. 110,530.

Our invention relates to sash weight pulleys in which the simplicity of construction enters into the primary feature of the invention, to the extent of providing a sash weight pulley which can be manufactured for a nominal sum and yet wherein the efficiency of the same is materially increased over ordinarily constructed pulleys of this nature.

A feature of the invention resides in a bearing core for our sash weight pulley which is of a nonmetallic material and which is fixedly secured in the axis of the pulley by the roughened, unfinished surface of the core in the pulley which engages the nonmetallic core in a manner to hold it against movement therein.

It is also feature of our invention to provide a nonmetallic core for our pulley which is treated with a lubricant so that the core provides a self lubricating means for holding the pulley on the supporting axle and to prevent the same from engaging the side walls of the pulley housing. The invention includes washer-like members associated with the core member which space the pulley from the sides of the pulley housing.

It is also an important part of our invention to provide an angular core opening in the pulley which receives a nonmetallic core member of an angular shape on the outside to conform with the angular shape in the pulley, while the core opening in the core member is of a circular formation. It is evident that the core member of a nonmetallic nature can be made of any suitable material and preferably that kind of material which is adapted to absorb lubricant and retain the same. The nonmetallic core member extends through the pulley in a manner to extend beyond the sides of the same and engage slightly against the side walls of the pulley housing.

In the drawings forming part of our specification,

Figure 1:
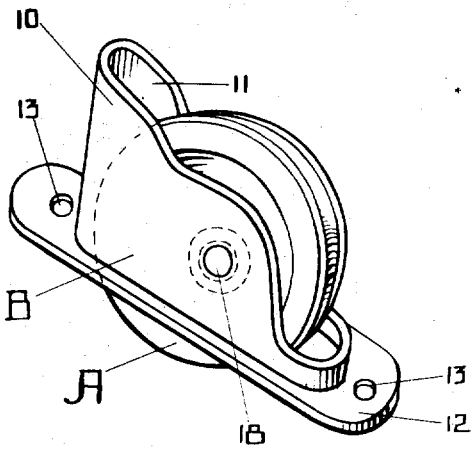
Figure 1 is a perspective view of our pulley and housing.
Figure 2:
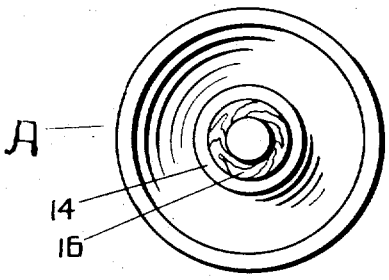
Figure 2 is a side view of the pulley.

In the drawings our sash pulley A is held in the ordinary pulley housing B which is provided with side walls 10 and 11 which are formed integral with the base plate 12. Openings 13 for screws which are adapted to hold the pulley and housing in position in the window sash are formed in the base plate 12. The housing and base plate are of the ordinary well known construction.

Figure 3:
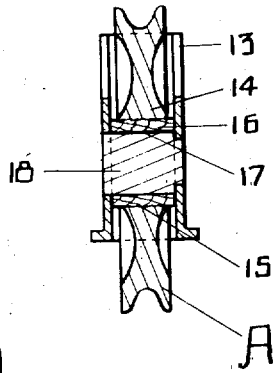
Figure 3 is a central section through the pulley and housing.

Our pulley A is provided with a core opening 14 which is axially positioned within the pulley and which is formed with a roughened or serrated surface 15 extending through the core opening 14 which is adapted to rigidly engage the nonmetallic core member 16, which is in the form of a sleeve and which extends through the core opening 14 so as to project slightly on either side of the pulley A, as is illustrated in Figure 3.

The core member 16 is forced into the opening 14 in the pulley A and the roughened surface 15 holds the same against movement therein. In the formation of our pulleys A by means of this construction the pulleys can be cast and it is not necessary to machine the same as is true where the pulley is used without our nonmetallic core member 16.

Our nonmetallic core member 16 is of a nonmetallic construction, having a fibrous nature which is adapted to absorb a lubricant so that it can be treated to provide a core member which is adapted to lubricate the pulley and project on either side of the same so as to make a sash weight pulley which is practically noiseless in operation and which will operate much more freely than in constructions heretofore used.

By means of our invention the pulleys A do not require any machine work and thus, by using the nonmetallic core members 16 which are treated with a lubricant, a very economical pulley can be made, which is far superior in operation than without our nonmetallic core member. Our core member 16 is provided with a smooth inner bearing surface 17 which engages the pulley retaining pin 18 or axle supporting the pulley, which is supported by the side walls 10 and 11 of the pulley housing B. Thus the core bearing member 16 provides a very effective means of interposing a finished nonmetallic lubricant treated member between the pulley and the retaining pin 18, which provides the necessary lubricant.

The projecting portions of the member 16 are clearly illustrated engaging the inner surfaces of the side walls 10 and 11 of the pulley housing B. This prevents the pulley from scraping the housing and eliminates any noise so that the pulley is practically noiseless in operation, being properly lubricated at all times.

To increase the efficiency of our pulley where it may be desired we prefer to use washer-like nonmetallic members 19 positioned on either side of the pulley A and directly engaging and supported by the projecting ends of the nonmetallic core member 16, thus providing a wide bearing surface on either side of the pulley which is nonmetallic and which is treated with a lubricant so that the pulley is not only lubricated from the bearing point on the pin 18, but also with the side walls 10 and 11 of the housing. This is a very important feature of our invention.

Figure 5:
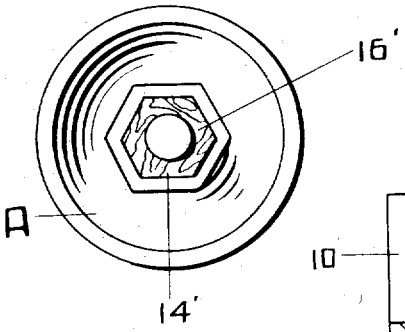
Figure 5 is a modified formation of the core in the pulley.
Figure 4:
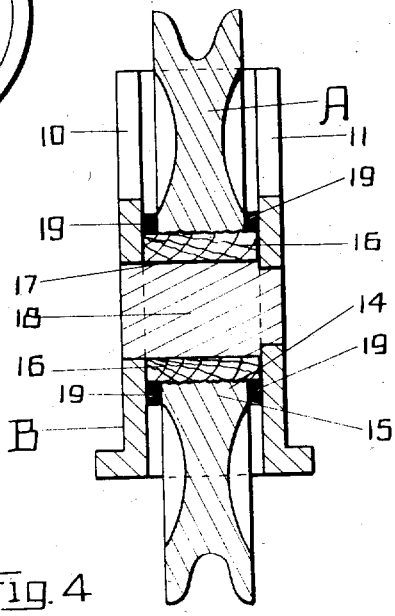
Figure 4 is an enlarged central section of an alternative construction of our invention.

In the construction illustrated in Figure 5 the core opening 14′ of the pulley A is of an angular nature, being illustrated hexagonal in formation, it being obvious that it can be of any suitable angular shape, is adapted to hold the similarly shaped core member 16′ which is driven into the core opening 14′ and held rigidly with the ends of the member 16′ projecting in the same manner as illustrated in Figures 3 and 4 of our drawings. The inner surface of the core opening 14′ is roughened as is illustrated in the pulley shown in Figures 3 and 4 by 15, so that the nonmetallic core member or bushing 16′ is held rigidly and firmly to the pulley A.

In carrying out our invention we have provided a sash weight pulley which is much more efficient because of the lubricated core bushing member which engages the supporting axle of the pulley and also provides a means for making the pulley A practically noiseless in operation, yet the construction is such, by casting the pulleys and using the roughened surface 15 to hold the bushing 16 in position, that the pulleys are not increased in cost of manufacture and yet are far superior to the ordinarily constructed pulleys. Thus we have provided a sash weight pulley which is very practical and is in great demand, and which we can supply to the trade for practically the same cost of ordinarily constructed sash weight pulleys.

In accordance with the patent statutes we have described the principles of our sash weight pulleys, and while we have illustrated a particular construction, we desire to have it understood that this is only illustrative of our invention and that the same can be carried out by other means and applied to uses other than those above set forth within the scope of the following claims.

We claim:

1. A sash weight pulley including, a housing having parallel side walls, a pulley adapted to be positioned between said side walls, a cored polyangular opening formed through said pulley having an inner roughened serrated surface and a nonmetallic core bushing member treated with a lubricant adapted to be held fixed by said roughened cored surface in said pulley.

2. A sash weight pulley having a casing, said pulley having a cored bore formed therethrough, the inner surface of said bore being rough and unfinished, and a fibrous bushing fitting tightly within said bore with its ends extending beyond the ends of the bore, said bushing being held sufficiently tight within the bore to prevent the side of the pulley from contacting the inner surface of the casing, said bushing having its peripheral surface engaged and penetrated by the projections of said unfinished bore surface and with the ends of the bushing abutting the inner surfaces of the casing.

3. In a device of the character described, a casing, a pulley therein having a hole therethrough, a pivot pin rigidly held in the casing for supporting the pulley, a fibrous bushing surrounding the pin and tightly held in the hole through the pulley to prevent relative movement between the bushing and pulley, the ends of the bushing abutting the inner walls of the casing, and means on the exterior of the bushing to positively prevent the pulley from slipping endwise of the bushing and contacting the inner surface of the casing.

ERNEST S. REILAND.
PETER M. REILAND.